(12) United States Patent
Lin

(10) Patent No.: US 12,521,075 B2
(45) Date of Patent: Jan. 13, 2026

(54) SYSTEM AND METHOD FOR MEDICAL IMAGING

(71) Applicant: SHANGHAI UNITED IMAGING HEALTHCARE CO., LTD., Shanghai (CN)

(72) Inventor: Yongzhi Lin, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 353 days.

(21) Appl. No.: 18/190,159

(22) Filed: Mar. 27, 2023

(65) Prior Publication Data

US 2023/0225687 A1 Jul. 20, 2023

Related U.S. Application Data

(63) Continuation of application No. PCT/CN2020/118160, filed on Sep. 27, 2020.

(51) Int. Cl.
*A61B 6/46* (2024.01)
*A61B 6/00* (2006.01)

(52) U.S. Cl.
CPC ............... *A61B 6/469* (2013.01); *A61B 6/488* (2013.01)

(58) Field of Classification Search
USPC ........................................................ 382/128
See application file for complete search history.

(56) References Cited

U.S. PATENT DOCUMENTS

| | | |
|---|---|---|
| 2008/0103383 A1 | 5/2008 | Van Der Kouwe et al. |
| 2008/0183069 A1 | 7/2008 | Fujimoto |
| 2008/0201372 A1 | 8/2008 | Fukatsu et al. |
| 2011/0280443 A1 | 11/2011 | Kitamura et al. |
| 2013/0182898 A1 | 7/2013 | Maeda et al. |
| 2014/0064449 A1 | 3/2014 | Deng et al. |
| 2014/0191753 A1* | 7/2014 | Oh ................. G01R 33/4835 324/309 |
| 2019/0029559 A1 | 1/2019 | Nufer et al. |

(Continued)

FOREIGN PATENT DOCUMENTS

| | | |
|---|---|---|
| CN | 1781447 A | 6/2006 |
| CN | 105078495 A | 11/2015 |

(Continued)

OTHER PUBLICATIONS

International Search Report in PCT/CN2020/118160 mailed on Jun. 24, 2021, 5 pages.

(Continued)

*Primary Examiner* — Jacky X Zheng
(74) *Attorney, Agent, or Firm* — METIS IP LLC

(57) ABSTRACT

The present disclosure provides a system and method for magnetic resonance imaging. The method may include obtaining reference information associated with at least two regions of interest (ROIs) of a subject. The method may also include obtaining a plurality of images associated with the at least two ROIs, the plurality of images being determined based on scanning data of the at least two ROIs generated in a single scan performed on the at least two ROIs by an imaging device. The method may further include identifying local images of each of the at least two ROIs from the plurality of images based on the reference information.

20 Claims, 8 Drawing Sheets

(56) References Cited

U.S. PATENT DOCUMENTS

2021/0068776 A1* 3/2021 Quan ................ G16H 30/20
2021/0225003 A1* 7/2021 Wang ................ G06V 10/26

FOREIGN PATENT DOCUMENTS

| CN | 111528895 A | 8/2020 |
| JP | 2015226754 A | 12/2015 |
| KR | 20080069809 A | 7/2008 |

OTHER PUBLICATIONS

Written Opinion in PCT/CN2020/118160 mailed on Jun. 24, 2021, 4 pages.

* cited by examiner

600

```
┌─────────────────────────────────────────┐
│ Obtaining a plurality of images         │── 610
│ associated with at least two ROIs       │
└─────────────────────────────────────────┘
                    ↓
┌─────────────────────────────────────────┐
│ For each of the at least two ROIs,      │── 620
│ determining a start position and an     │
│ end position of the ROI in a            │
│ reference image                         │
└─────────────────────────────────────────┘
                    ↓
┌─────────────────────────────────────────┐
│ Identifying, from the plurality of      │── 630
│ images, a start image and an end image  │
│ corresponding to the start position and │
│ the end position, respectively.         │
└─────────────────────────────────────────┘
                    ↓
┌─────────────────────────────────────────┐
│ Determining the start image, the end    │── 640
│ image, and intermediate images between  │
│ the start image and the end image as    │
│ local images of the ROI                 │
└─────────────────────────────────────────┘
```

┌─────────────────────────────────────────────┐
│ Sequentially processing the plurality of images, │
│ during which, for one of the plurality of images, │  ~ 810
│ identifying anatomical features in the image and │
│ recognizing a portion of an ROI in the image based │
│ on the anatomical features by using a recognition │
│ algorithm or a recognition model │
└─────────────────────────────────────────────┘
                        ↓
┌─────────────────────────────────────────────┐
│ Determining a start image of the ROI from the │  ~ 820
│ plurality of images │
└─────────────────────────────────────────────┘
                        ↓
┌─────────────────────────────────────────────┐
│ Determining an end image of the ROI from the │  ~ 830
│ plurality of images │
└─────────────────────────────────────────────┘
                        ↓
┌─────────────────────────────────────────────┐
│ Determining the start image, the end image, and │  ~ 840
│ intermediate images between the start image and │
│ the end image as the local images of the ROI │
└─────────────────────────────────────────────┘

FIG. 8

SYSTEM AND METHOD FOR MEDICAL IMAGING

CROSS-REFERENCE TO RELATED APPLICATIONS

This application is a continuation of International Application No. PCT/CN2020/118160, filed on Sep. 27, 2020, the contents of which are hereby incorporated by reference.

TECHNICAL FIELD

The present disclosure generally relates to medical imaging, and in particular, to systems and methods for identifying medical images of different regions.

BACKGROUND

Medical imaging techniques (e.g., magnetic resonance imaging (MRI), positron emission tomography (PET), computed tomography (CT), single-photon emission computed tomography (SPECT)) are widely used in clinical diagnosis and/or treatment. In a conventional medical imaging process, if two or more regions of interest (ROIs) (e.g., the brain, the chest) of a subject (e.g., a patient) are to be imaged, two or more scans should be performed for the two or more ROIs at stand-alone sessions according to corresponding scanning protocols, which results in that the subject endures a long waiting time and an excessive radiation exposure. Therefore, it is desirable to provide systems and methods for obtaining images of different regions of a subject efficiently with shortened scanning time and reduced radiation exposure.

SUMMARY

According to one aspect of the present disclosure, a system is provided. The system may include at least one storage device storing a set of instructions and at least one processor configured to communicate with the at least one storage device. When executing the set of instructions, the at least one processor may be configured to direct the system to perform the following operations. The following operations may include obtaining reference information associated with at least two regions of interest (ROIs) of a subject; obtaining a plurality of images associated with the at least two ROIs, the plurality of images being determined based on scanning data of the at least two ROIs generated in a single scan performed on the at least two ROIs by an imaging device; and identifying local images of each of the at least two ROIs from the plurality of images based on the reference information.

According to another aspect of the present disclosure, a method is provided. The method may be implemented on a computing device having a processor and a computer-readable storage device. The method may comprise obtaining reference information associated with at least two regions of interest (ROIs) of a subject; obtaining a plurality of images associated with the at least two ROIs, the plurality of images being determined based on scanning data of the at least two ROIs generated in a single scan performed on the at least two ROIs by an imaging device; and identifying local images of each of the at least two ROIs from the plurality of images based on the reference information.

According to a further aspect of the present disclosure, a non-transitory computer-readable storage medium may be provided. The non-transitory computer-readable storage medium may include instructions, that, when accessed by at least one processor of a system, causes the system to perform a method. The method may comprise obtaining reference information associated with at least two regions of interest (ROIs) of a subject; obtaining a plurality of images associated with the at least two ROIs, the plurality of images being determined based on scanning data of the at least two ROIs generated in a single scan performed on the at least two ROIs by an imaging device; and identifying local images of each of the at least two ROIs from the plurality of images based on the reference information.

In some embodiments, the reference information includes a scout image or an optical image of the at least two ROIs, the scout image or the optical image indicating position information of the at least two ROIs during the single scan.

In some embodiments, identifying the local images of each of the at least two ROIs from the plurality of images based on the reference information includes: for each of the at least two ROIs, determining a start position and an end position of the ROI in the scout image or the optical image; and identifying the local images of the ROI from the plurality of images based on the start position and the end position.

In some embodiments, identifying the local images of the ROI from the plurality of images based on the start position and the end position includes: identifying, from the plurality of images, a start image and an end image corresponding to the start position and the end position, respectively; and determining the start image, the end image, and intermediate images between the start image and the end image as the local images of the ROI.

In some embodiments, the reference information includes a recognition algorithm or a recognition model associated with the at least two ROIs.

In some embodiments, identifying the local images of each of the at least two ROIs from the plurality of images based on the reference information includes: for each of the at least two ROIs, sequentially processing the plurality of images, during which, for one of the plurality of images, identifying anatomical features in the image; and recognize a portion of the ROI in the image based on the anatomical features by using the recognition algorithm or the recognition model; determining a start image of the ROI from the plurality of images, the start image corresponding to a time point when a portion of the ROI is firstly recognized during sequentially processing the plurality of images; determining an end image of the ROI from the plurality of images, the end image corresponding to a time point when a portion of the ROI is lastly recognized during sequentially processing the plurality of images; and determining the start image, the end image, and intermediate images between the start image and the end image as the local images of the ROI.

In some embodiments, the single scan is performed according to a scanning protocol determined based at least in part on a scout image associated with the at least two ROIs.

In some embodiments, the operations further includes for each of the at least two ROIs, assigning a corresponding label to the local images of the ROI.

In some embodiments, the operations further includes dividing local images of the at least two ROIs into respective groups to be processed separately.

In some embodiments, the operations further includes obtaining, from a user device, a request for local images of a target ROI of the at least two ROIs; retrieving local images of the target ROI; and transmitting the retrieved local images of the target ROI to the user device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating an exemplary process for identifying local images of each of at least two ROIs from a plurality of images according to some embodiments of the present disclosure;

FIG. 8 is a flowchart illustrating an exemplary process for identifying local images of each of at least two ROIs from a plurality of images according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

Figure 2:
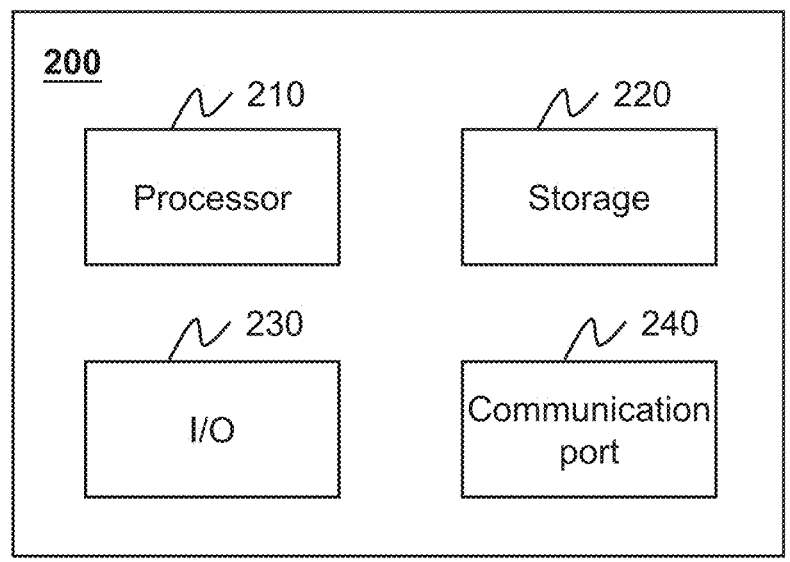
FIG. 2 is a schematic diagram illustrating an exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

Provided herein are systems and methods for non-invasive imaging, such as for disease diagnosis, treatment, and/or research purposes. In some embodiments, the imaging system may include a single modality system and/or a multi-modality system. The term "modality" used herein broadly refers to an imaging or treatment method or technology that gathers, generates, processes, and/or analyzes imaging information of a subject or treatments the subject. The single modality system may include a computed tomography (CT) system, a magnetic resonance imaging (MRI) system, an ultrasound imaging system, an X-ray imaging system, an ultrasonography system, a positron emission tomography (PET) system, an optical coherence tomography (OCT) imaging system, an ultrasound (US) imaging system, an intravascular ultrasound (IVUS) imaging system, a near-infrared spectroscopy (NIRS) imaging system, or the like, or any combination thereof. The multi-modality system may include an X-ray imaging-magnetic resonance imaging (X-ray-MRI) system, a positron emission tomography-X-ray imaging (PET-X-ray) system, a single-photon emission computed tomography-magnetic resonance imaging (SPECT-MRI) system, a positron emission tomography-computed tomography (PET-CT) system, a C-arm system, a positron emission tomography-magnetic resonance imaging (PET-MR) system, a digital subtraction angiography-magnetic resonance imaging (DSA-MRI) system, or the like, or any combination thereof.

In the present disclosure, the term "image" may refer to a two-dimensional (2D) image, a three-dimensional (3D) image, or a four-dimensional (4D) image. In some embodiments, the term "image" may refer to an image of a region (e.g., a region of interest (ROI)) of a subject. As described above, the image may be a CT image, a PET image, an MR image, a fluoroscopy image, an ultrasound image, an Electronic Portal Imaging Device (EPID) image, etc.

In the present disclosure, the object may include a biological object and/or a non-biological object. The biological object may be a human being, an animal, a plant, or a specific portion, organ, and/or tissue thereof. For example, the object may include a head, a neck, a thorax, a heart, a stomach, a blood vessel, a soft tissue, a tumor, a nodule, or the like, or any combination thereof. In some embodiments, the object may be a man-made composition of organic and/or inorganic matters that are with or without life. The term "object" or "subject" are used interchangeably in the present disclosure.

An aspect of the present disclosure relates to systems and methods for medical imaging. The system may obtain reference information associated with at least two regions of interest (ROIs) of a subject and obtain a plurality of images associated with the at least two ROIs. The plurality of images may be determined based on scanning data of the at least two ROIs generated in a single scan performed on the at least two ROIs by an imaging device. The reference information may include a scout image or an optical image of the at least two ROIs. The scout image or the optical image indicates position information of the at least two ROIs during the single scan. The reference information may also include a recognition algorithm or a recognition model used to recognize the at least two ROIs in an image. The system may further identify local images of each of the at least two ROIs automatically from the plurality of images based on the reference information. According to the present disclosure, since the scanning data used to determine the plurality of images are obtained by a single scan, the scanning time of the subject may be shortened and the radiation exposure on the subject may be effectively reduced. Besides, local images of each of the at least two ROIs can be automatically identified from the plurality of images based on the reference information, thereby improving the imaging efficiency.

Figure 1:
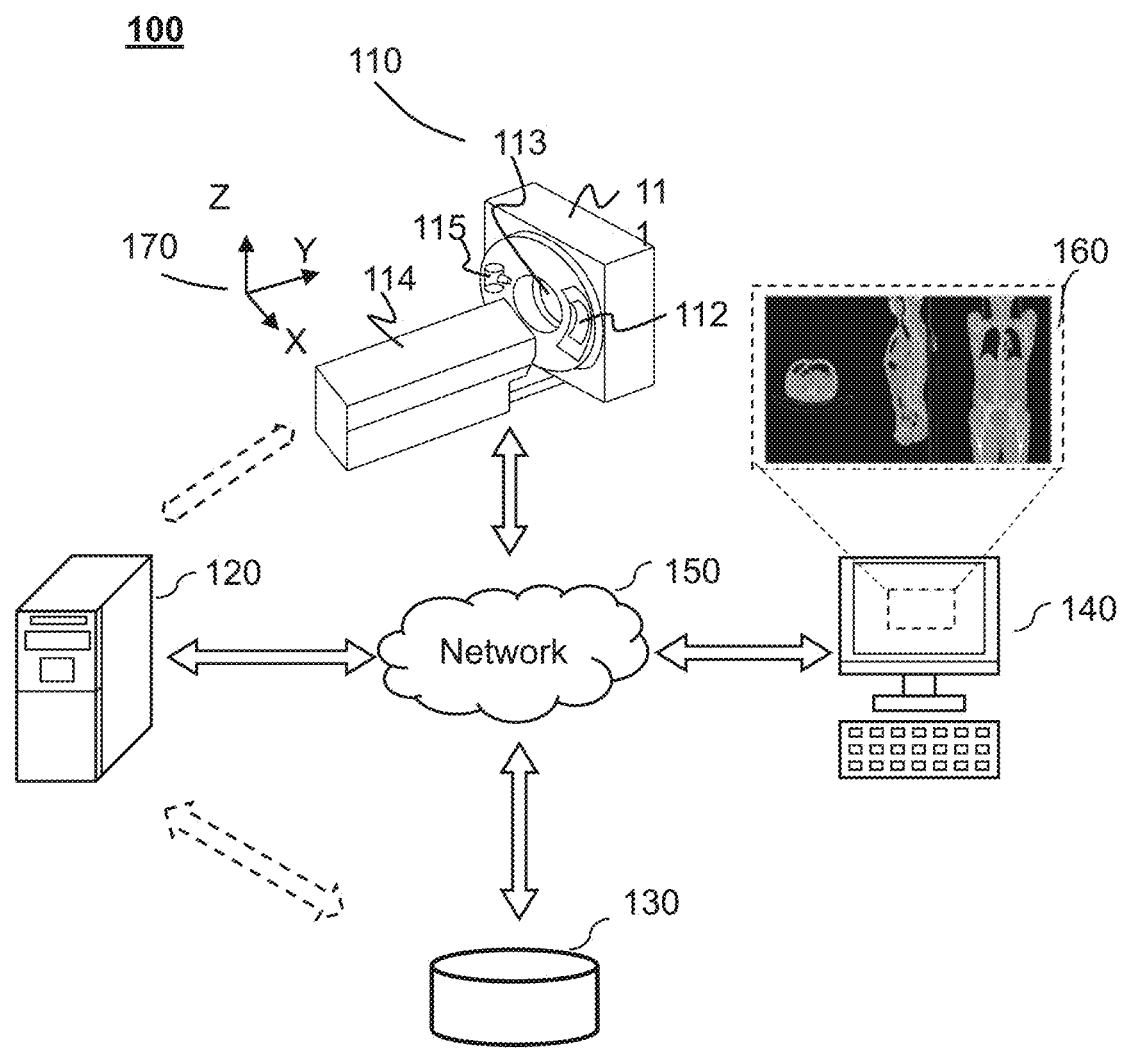
FIG. 1 is a schematic diagram illustrating an exemplary imaging system according to some embodiments of the present disclosure.

FIG. 1 is a schematic diagram illustrating an exemplary imaging system according to some embodiments of the present disclosure. As illustrated in FIG. 1, the imaging system 100 may include a scanner 110, a processing device 120, a storage device 130, a terminal device 140, and a network 150. In some embodiments, two or more components of the imaging system 100 may be connected to and/or communicate with each other via a wireless connection, a wired connection, or a combination thereof. The connection among the components of the imaging system 100 may be variable. Merely by way of example, the scanner 110 may be connected to the processing device 120 through the network 150 or directly. As another example, the storage device 130 may be connected to the processing device 120 through the network 150 or directly.

The scanner 110 may be configured to scan a subject or a portion thereof that is located within its detection region and generate scanning data/signals relating to the (portion of) subject.

In some embodiments, the scanner 110 may include a single modality device. For example, the scanner 110 may include a CT scanner, a PET scanner, a SPECT scanner, an MR scanner, an ultrasonic scanner, an ECT scanner, or the like, or a combination thereof. In some embodiment, the scanner 110 may be a multi-modality device. For example, the scanner 110 may include a PET-CT scanner, a PET-MR scanner, or the like, or a combination thereof. The following descriptions are provided, unless otherwise stated expressly, with reference to a CT scanner for illustration purposes and not intended to be limiting.

As illustrated, the CT scanner may include a gantry 111, a detector 112, a detecting region 113, a table 114, and a radiation source 115. The gantry 111 may support the detector 112 and the radiation source 115. The subject may be placed on the table 114 for scanning. The radiation source 115 may emit x-rays. The x-rays may be emitted from a focal spot using a high-intensity magnetic field to form an x-ray beam. The x-ray beam may travel toward the subject. The detector 112 may detect x-ray photons from the detecting region 113. In some embodiments, the detector 112 may include one or more detector units. The detector unit(s) may be and/or include single-row detector elements and/or multi-row detector elements.

The processing device 120 may process data and/or information. The data and/or information may be obtained from the scanner 110 or retrieved from the storage device 130, the terminal device 140, and/or an external device (external to the imaging system 100) via the network 150. For example, the processing device 120 may reconstruct a plurality of images based on scanning data of at least two ROIs generated in a single scan performed on the at least two ROIs. As another example, the processing device 120 may identify images of each of the at least two ROIs from the plurality of images based on reference information associated with the at least two ROIs. In some embodiments, the processing device 120 may be a single server or a server group. The server group may be centralized or distributed. In some embodiments, the processing device 120 may be local or remote. For example, the processing device 120 may access information and/or data stored in the scanner 110, the terminal device 140, and/or the storage device 130 via the network 150. As another example, the processing device 120 may be directly connected to the scanner 110, the terminal device 140, and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented by a computing device 200 having one or more components as illustrated in FIG. 2.

The storage device 130 may store data, instructions, and/or any other information. In some embodiments, the storage device 130 may store data obtained from the scanner 110, the terminal device 140, and/or the processing device 120. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components (e.g., the processing device 120, the terminal device 140) of the imaging system 100. One or more components of the imaging system 100 may access the data or instructions stored in the storage device 130 via the network 150. In some embodiments, the storage device 130 may be directly connected to or communicate with one or more other components (e.g., the processing device 120, the terminal device 140) of the imaging system 100. In some embodiments, the storage device 130 may be part of the processing device 120.

The terminal device 140 may input/output signals, data, information, etc. In some embodiments, the terminal device 140 may enable a user interaction with the processing device 120. For example, the terminal device 140 may display an image of the subject on a screen 160. As another example, the terminal device 140 may obtain a user's input information through an input device (e.g., a keyboard, a touch screen, a brain wave monitoring device), and transmit the input information to the processing device 120 for further processing. The terminal device 140 may be a mobile device, a tablet computer, a laptop computer, a desktop computer, or the like, or any combination thereof. In some embodiments, the mobile device may include a home device, a wearable device, a virtual reality device, an augmented reality device, or the like, or any combination thereof. The home device may include a lighting device, a control device of an intelligent electrical apparatus, a monitoring device, a television, a video camera, an interphone, or the like, or any combination thereof. The wearable device may include a bracelet, a footgear, eyeglasses, a helmet, a watch, clothing, a backpack, an accessory, or the like, or any combination thereof. The virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal device 140 may be part of the processing device 120 or a peripheral device of the processing device 120 (e.g., a console connected to and/or communicating with the processing device 120).

The network 150 may include any suitable network that can facilitate the exchange of information and/or data for the imaging system 100. In some embodiments, one or more components (e.g., the scanner 110, the terminal device 140, the processing device 120, the storage device 130) of the imaging system 100 may communicate information and/or data with one or more other components of the imaging system 100 via the network 150. The network 150 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network, 4G network, 5G network), a frame relay network, a virtual private network (VPN), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

For illustration purposes, a coordinate system 170 is provided in FIG. 1. The coordinate system 170 may be a Cartesian system including an X-axis, a Y-axis, and a Z-axis. The X-axis and the Y-axis shown in FIG. 1 may be horizontal and the Z-axis may be vertical. As illustrated, the positive X direction along the X-axis may be from the left side to the right side of the table 114 viewed from the direction facing the front of the scanner 110; the positive Y direction along the Y-axis shown in FIG. 1 may be from the end to the head of the table 114; the positive Z direction along the Z-axis shown in FIG. 1 may be from the lower part to the upper part of the scanner 110.

It should be noted that the above description regarding the imaging system 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the imaging system 100 may include one or more additional components and/or one or more components of the imaging system 100 described above may be omitted. In some embodiments, a component of the imaging system 100 may be implemented on two or more sub-components. Two or more components of the imaging system 100 may be integrated into a single component.

FIG. 2 is a schematic diagram illustrating exemplary hardware and/or software components of an exemplary computing device according to some embodiments of the present disclosure. The computing device 200 may be configured to implement any component of the imaging system 100. For example, the scanner 110, the processing device 120, the storage device 130, and/or the terminal device 140 may be implemented on the computing device 200. Although only one such computing device is shown for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program codes) and perform functions of the processing device 120 in accordance with techniques described herein. The computer instructions may include, for example, routines, programs, objects, components, signals, data structures, procedures, modules, and functions, which perform particular functions described herein. In some embodiments, the processor 210 may perform instructions obtained from the terminal device 140 and/or the storage device 130. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the scanner 110, the terminal device 140, the storage device 130, or any other component of the medical system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, a camera capturing gestures, or the like, or a combination thereof. Exemplary output devices may include a display device, a loudspeaker, a printer, a projector, a 3D hologram, a light, a warning light, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the scanner 110, the terminal device 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
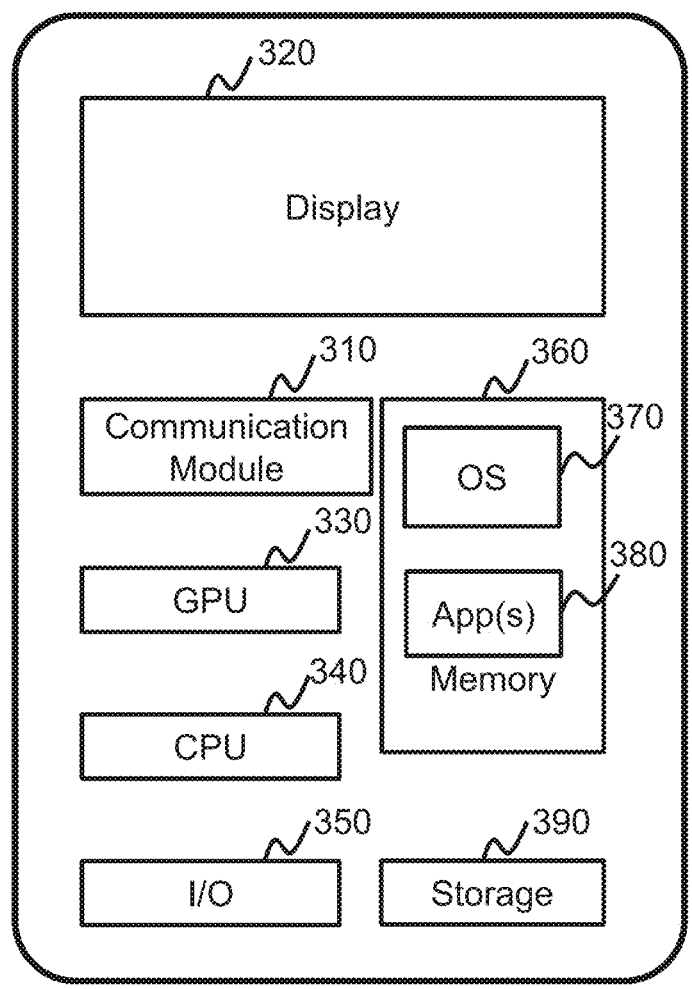
FIG. 3 is a schematic diagram illustrating hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the processing device 120 or the terminal device 140 may be implemented on the mobile device 300. As illustrated in FIG. 3, the mobile device 300 may include a communication module 310, a display 320, a graphics processing unit (GPU) 330, a central processing unit (CPU) 340, an I/O 350, a memory 360, and storage 390. The CPU 340 may include interface circuits and processing circuits similar to the processor 210. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to imaging from the imaging system on the mobile device 300. User interactions with the information stream may be achieved via the I/O devices 350 and provided to the processing device 120 and/or other components of the imaging system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
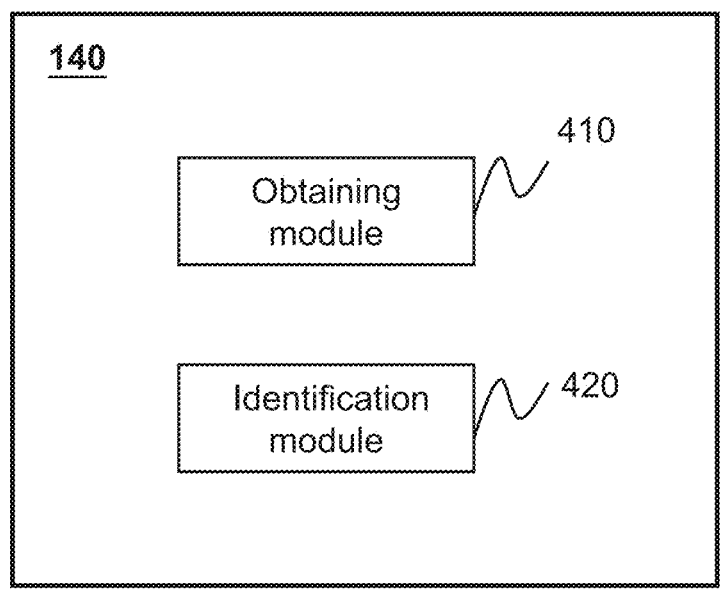
FIG. 4 is a block diagram illustrating an exemplary processing device according to some embodiments of the present disclosure.

FIG. 4 is a block diagram illustrating an exemplary processing device according to some embodiments of the present disclosure. As illustrated in FIG. 4, the processing device 120 may include an obtaining module 410 and an identification module 420.

The obtaining module 410 may be configured to obtain data and/or information. The obtaining module 410 may obtain data and/or information from the scanner 110, the storage device 130, the terminal(s) 140, or any devices or components capable of storing data via the network 150. In some embodiments, the obtaining module 410 may obtain reference information associated with at least two ROIs of a subject (e.g., a patient, a phantom). In some embodiment, the reference information associated with the at least two ROIs may include a reference image of the at least two ROIs of the subject. In some embodiments, the reference image may indicate position information of the at least two ROIs during an imaging scan. In some embodiments, the reference image may include a scout image or an optical image (e.g., a visible image, an infrared image) of the at least two ROIs. In some embodiments, the obtaining module 410 may further obtain a plurality of images associated with the at least two ROIs. The plurality of images may be being determined based on scanning data of the at least two ROIs generated in a single scan performed on the at least two ROIs by an imaging device (e.g., the scanner 110) In some embodiments, the obtained data and/or information may further include processed results, user instructions, algorithms, parameters (e.g., scanning parameters of the scanner 110), program codes, information of one or more subject, or the like, or a combination thereof.

The identification module 420 may be configured to identify local images of one or more ROIs. In some embodiments, the identification module 420 may identify local images of each of the at least two ROIs from the plurality of images based on the reference information. In some embodiments, the identification module 420 may determine a start position and an end position of the ROI in a reference image. The identification module 420 may identify, from the plurality of images, a start image and an end image corresponding to the start position and the end position, respectively. The start image, the end image, and intermediate images between the start image and the end image may be determined as the local images of the ROI.

In some embodiments, the processing device 120 may also include a labeling module (not shown) and a grouping module (not shown).

The labeling module may be configured to assign a corresponding label to each or at least a part of local images of a ROI. The label may include information regarding of a ROI, scanning parameters of the scanner 110, basic information (e.g., name, gender, age, weight, historical treatment records) of the subject, a time when the imaging scan is performed, or the like, or any combination thereof. In some embodiments, the label may be in the form of an image, text, a video, an annotation, or the like, or a combination thereof.

The grouping module may be configured to divide the local images of the at least two ROIs into respective groups. For example, it is assumed that the at least two ROIs include the chest and the abdomen, accordingly, the grouping module may divide the local images of the two ROIs into two groups, for example, a first group including local images of the chest and a second group including local images of the abdomen.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the above-mentioned modules may be integrated into a console (not shown). Via the console, a user may set parameters for scanning a subject, controlling imaging processes, controlling parameters for reconstruction of an image, identifying images of different ROIs, dividing images of different ROIs into corresponding groups, viewing images, etc. As another example, the processing device 120 may include a storage module (not shown) configured to store information and/or data (e.g., scanning data, images) associated with the above-mentioned modules.

Figure 5:
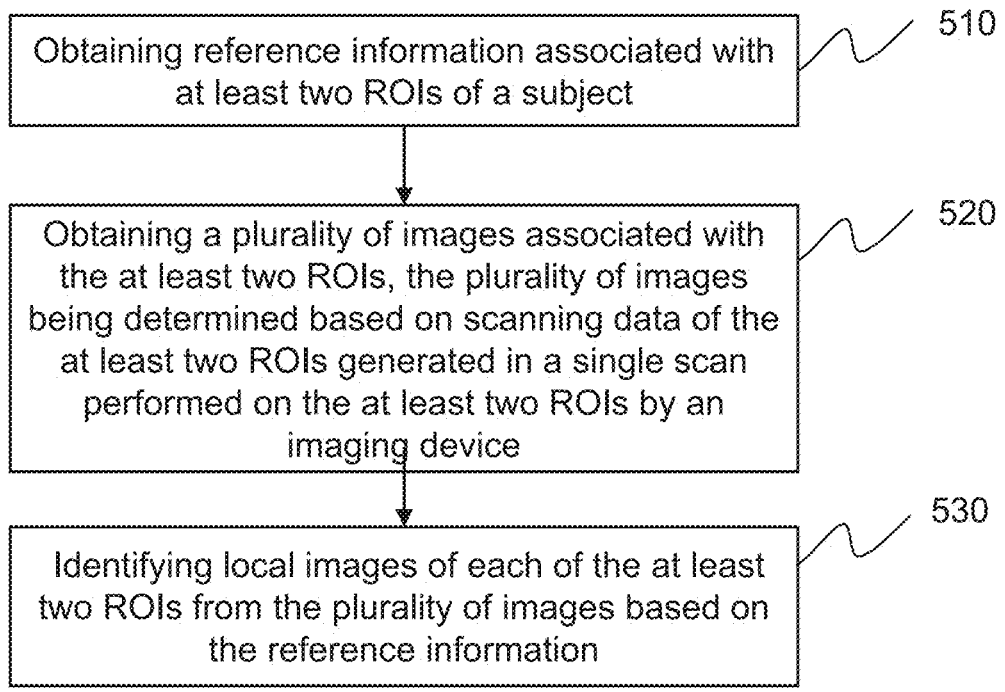
FIG. 5 is a flowchart illustrating an exemplary process for identifying local images of each of at least two ROIs from a plurality of images according to some embodiments of the present disclosure.

FIG. 5 is a flowchart illustrating an exemplary process for identifying images of each of at least two ROIs according to some embodiments of the present disclosure.

In some embodiments, the process 500 may be executed by the imaging system 100. For example, the process 500 may be implemented as a set of instructions (e.g., an application) stored in a storage device (e.g., the storage device 130). The modules described in FIG. 4 and/or the processor 210 may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the processor 210) (e.g., the obtaining module 410) may obtain reference information associated with at least two ROIs of a subject (e.g., a patient, a phantom).

As used herein, an ROI may refer to a region including one or more specific portions (e.g., an organ, a tissue, a physical point) of the subject. Accordingly, the at least two ROIs of the subject may be at least two regions including at least two specific portions of the subject. For example, the at least two ROIs may include a region including a brain, and a region including a chest, a region including an abdomen. As another example, the at least two ROIs may include a region including a lung and a region including a stomach. As a further example, the at least two ROIs may include a region including blood vessels in the heart and a region including blood vessels in the knee.

In some embodiment, the reference information associated with the at least two ROIs may include a reference image of the at least two ROIs of the subject. In some embodiments, the reference image may indicate position information of the at least two ROIs during an imaging scan. The position information may include positions relative to a target point, a target line, and/or a target plane, coordinates in a coordinate system (e.g., the coordinate system 160 illustrated in FIG. 1), or the like, or any combination thereof. In some embodiments, the reference image may also indicate other information of the at least two ROIs, such as a shape, an edge, grey values of pixels, etc. In some embodiments, the reference image may include a scout image or an optical image (e.g., a visible image, an infrared image) of the at least two ROIs.

In some embodiments, the scout image may be obtained by scanning the subject or a portion thereof using the scanner 110. For example, the scanner 110 may be directed to perform a pre-scan (e.g., a CT positioning scan) on a pre-scan region (which at least includes the at least two ROIs) of the subject according to a pre-scan protocol. The pre-scan protocol may include parameters (e.g., a scanning voltage, a scanning current) of the scanner 110, a scanning mode (e.g., spiral scanning, axial scanning) of the scanner 110, a size of the pre-scan region, position information of the pre-scan region, information regarding image contrast and/or ratio, or the like, or any combination thereof. Further, the scout image may be determined based on scanning data generated in the pre-scan performed by the scanner 110.

In some embodiments, the optical image may be obtained by a capture device (e.g., an optical camera, an infrared capture device). In some embodiments, the capture device may be mounted on, for example, the gantry 111 of the scanner 110 facing towards the subject. The capture device may generate the optical image when the subject is placed on the table 114 before the imaging scan starts.

In some embodiments, the reference information associated with the at least two ROIs may include a recognition algorithm or a recognition model associated with the at least two ROIs. The recognition algorithm or the recognition model may be used to recognize an ROI or a portion of an ROI in an image based on image features (e.g., anatomical features) in the image. Exemplary recognition algorithms may include a scale-invariant feature transform (SIFT) algorithm, a speed up robust feature (SURF) algorithm, a features from accelerated segment test (FAST) algorithm, a binary robust independent elementary features (BRIEF) algorithm, an oriented FAST and rotated BRIEF (ORB) algorithm, or the like, or a combination thereof. Exemplary recognition models may include a deep belief network (DBN), a Stacked Auto-Encoders (SAE), a logistic regression (LR) model, a support vector machine (SVM) model, a decision tree model, a Naive Bayesian Model, a random forest model, or a Restricted Boltzmann Machine (RBM), a Gradient Boosting Decision Tree (GBDT) model, a LambdaMART model, an adaptive boosting model, a recurrent neural network (RNN) model, a convolutional network model, a hidden Markov model, a perceptron neural network model, a Hopfield network model, or the like, or any combination thereof.

In some embodiments, the recognition model may be a model trained based on a plurality of sample images. In some embodiments, the plurality of sample images may include historical images determined based on historically scanning data. In some embodiments, sample anatomical features of various portions (e.g., eye sockets, knee joints) in the plurality of sample images may be extracted and used to train a preliminary recognition model. Exemplary sample anatomical features may include an outline, a shape, a size, an edge, a gray value, or the like, or a combination thereof. The sample anatomical features may be in the form of a vector, a matrix, etc. The sample anatomical features of the plurality of sample images may be input into the preliminary recognition model and the preliminary recognition model may be iteratively updated until a loss function (e.g., a cross-entropy loss function) reaches a convergence, that is, the training process is terminated.

In 520, the processing device 120 (e.g., the processor 210) (e.g., the obtaining module 410) may obtain a plurality of images associated with the at least two ROIs, the plurality of images being determined based on scanning data of the at least two ROIs generated in a single scan performed on the at least two ROIs by an imaging device (e.g., the scanner 110).

As used herein, a single scan may refer to scan operations sequentially performed on the at least two ROIs at one time. In this case, if all the at least two ROIs are needed to be scanned due to imaging requirements or clinical requirements, the scanning time can be shortened and the radiation exposure on the subject can be effectively reduced.

In some embodiments, the single scan may correspond to an imaging scan region, which at least includes the at least two ROIs. In some embodiments, the imaging scan region may be a default setting of the imaging system 100 or may be adjustable under different situations. For example, the imaging scan region may be specified by a user (e.g., a doctor, a radiologist) based on the reference image. Specifically, the user may draw a rectangular box including the at least two ROIs in the scout image of the at least two ROIs as the imaging scan region. As another example, the imaging scan region may be determined by the processing device 120 based on statistical data or big data analysis. Specifically, the processing device 120 may determine approximate regions corresponding to different ROIs based on profile information (e.g., age, height, weight) of the subject according to the statistical data or the big data analysis.

In some embodiments, the single scan may be performed according to a scanning protocol. Similar to the pre-scan protocol, the scanning protocol may include parameters of the scanner 110, a scanning mode of the scanner 110, a size of the imaging scan region, position information of the imaging scan region, etc.

In some embodiments, the scanning protocol may be determined based at least in part on the reference image (e.g., a scout image) associated with the at least two ROIs. For example, it is assumed that the at least two ROIs include the chest and the abdomen, scanning parameters (e.g., a scanning voltage and/or a scanning current) of the scanner 110 for the chest may be different from those for the abdomen. During the single scan, the imaging system 110 may obtain position information of the chest and the abdomen based on a scout image of the chest and the abdomen. The scanning parameters of the scanner 110 may be adjusted adaptively according to the position information of the chest and the abdomen. Specifically, when the processing device 120 determines that the scanner 110 starts to scan the chest according to the position information of the chest, the processing device 120 may adjust the scanning parameters of the scanner 110 to scanning parameters specialized for the chest.

During the single scan, the detector 112 may detect rays impinging thereon, including those passing through the subject, thereby generating the scanning data of the at least two ROIs. Further, the plurality of images associated with the at least two ROIs may be reconstructed based on the scanning data according to an image reconstruction algorithm. Exemplary image reconstruction algorithms may include an iterative reconstruction algorithm (e.g., a statistical reconstruction algorithm), a Fourier slice theorem algorithm, a filtered back projection (FBP) algorithm, a fan-beam reconstruction algorithm, an analytic reconstruction algorithm, or the like, or any combination thereof. Exemplary iterative reconstruction algorithms may include but not limited to a model-based iterative CT image reconstruction (MBIR), an algebraic reconstruction, a statistical reconstruction, a learned iterative reconstruction, etc.

In 530, the processing device 120 (e.g., the processor 210) (e.g., the identification module 420) may identify local images of each of the at least two ROIs from the plurality of images based on the reference information.

In some embodiments, as described in connection with operation 510, the reference information may include a reference image (e.g., a scout image or an optical image) of the at least two ROIs indicating position information of the at least two ROIs during the single scan. Accordingly, for each of the at least two ROIs, the processing device 120 may determine a target position (e.g., a start position, an end position) of the ROI in the reference image and identify the local images of the ROI from the plurality of images based on the target position. In this way, the local images of each of the at least two ROIs can be efficiently and accurately identified. More descriptions may be found elsewhere in the present disclosure (e.g., FIG. 6 and the description thereof).

In some embodiments, as described in connection with operation 510, the reference information may include a recognition algorithm or a recognition model associated with the at least two ROIs. Accordingly, for each of the at least two ROIs, the processing device 120 may sequentially process the plurality of images and identify a start image and an end image of the ROI from the plurality of images during sequentially processing the plurality of images. Further, the processing device 120 may identify the local images of the ROI from the plurality of images based on the start image and the end image. More descriptions may be found elsewhere in the present disclosure (e.g., FIG. 8 and the description thereof).

In some embodiments, for each of the at least two ROIs, after identifying the local images of the ROI from the plurality of images, the processing device 120 may assign a corresponding label to each or at least a part of the local images of the ROI. The label may include information regarding the ROI, scanning parameters of the scanner 110, basic information (e.g., name, gender, age, weight, historical treatment records) of the subject, a time when the imaging scan is performed, or the like, or any combination thereof. In some embodiments, the label may be in the form of an image, text, a video, an annotation, or the like, or a combination thereof.

In some embodiments, the processing device 120 may further divide the local images of the at least two ROIs into respective groups. For example, it is assumed that the at least two ROIs include the chest and the abdomen, accordingly, the processing device 120 may divide the local images of the two ROIs into two groups, for example, a first group including local images of the chest and a second group including local images of the abdomen. Further, the divided local images in the groups may be processed (e.g., segmented, denoised, filtered, stitched, analyzed) separately.

In some embodiments, the groups, each of which includes local images of an ROI, may be stored at different places (e.g., different areas or units in a storage device, different storage devices) in the imaging system 100. When the processing device 120 obtains, from a user device (e.g., the terminal device 140), a request for local images of a target ROI, the processing device 120 may retrieve local images of the target ROI in a corresponding group and transmit the retrieved local images of the target ROI to the user device.

It should be noted that the above description of the process 500 is provided for the purposes of illustration, not intended to limit the scope of the present disclosure. For persons having ordinary skills in the art, multiple variations and modifications may be reduced to practice in the light of the present disclosure. However, these variations and modifications fall in the scope of the present disclosure. For example, the plurality of images associated with the at least two ROIs may be obtained from a storage device (e.g., the storage device 130, the storage 220, the storage 390) capable of storing data in the imaging system 100.

FIG. 6 is a flowchart illustrating an exemplary process for identifying local images of each of at least two ROIs from a plurality of images according to some embodiments of the present disclosure. In some embodiments, the process 600 may be executed by the imaging system 100. For example, the process 600 may be implemented as a set of instructions (e.g., an application) stored in a storage device (e.g., the storage device 130). The modules described in FIG. 4 and/or the processor 210 may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

Figure 7:
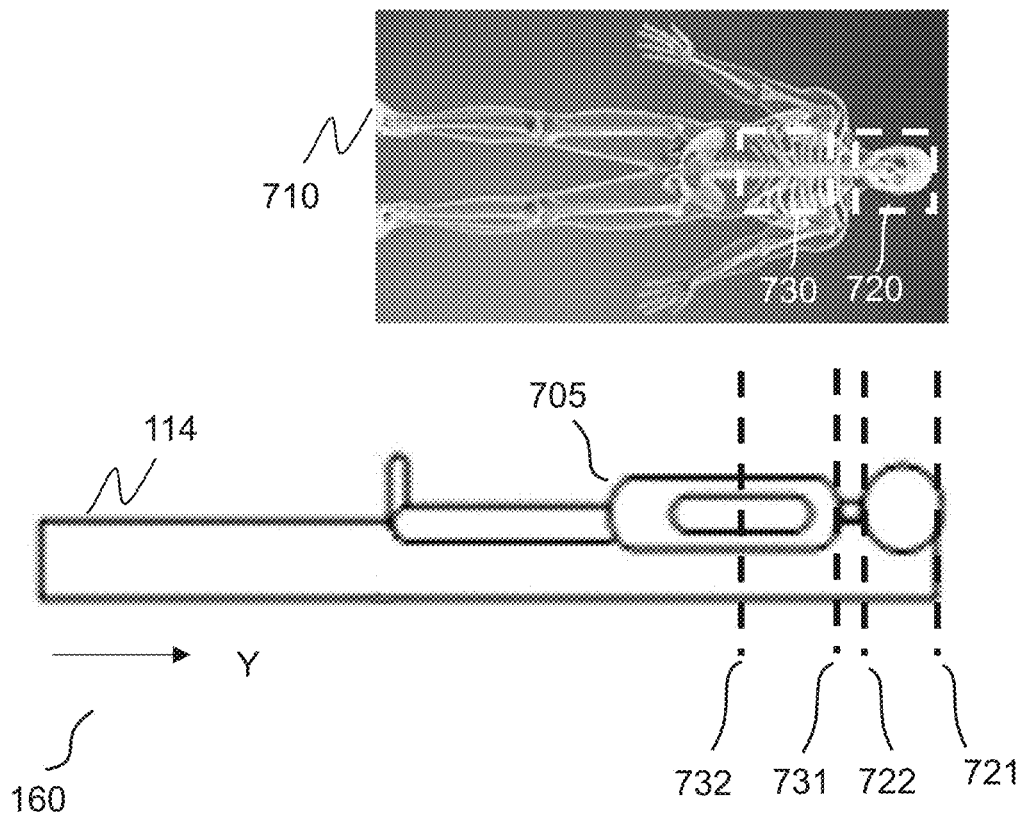
FIG. 7 is a schematic diagram illustrating an exemplary process for determining a start position and an end position of an ROI in a reference image according to some embodiments of the present disclosure.

In 610, as described in connection with operation 510, the processing device 120 (e.g., the processor 210) (e.g., the obtaining module 410) may obtain a plurality of images associated with at least two ROIs. For example, as illustrated in FIG. 7, take a patient 705 as an example, the at least two ROIs may include a first ROI including a head (also can be referred to as "head" for brevity) 720 and a second ROI including a chest (also can be referred to as "chest" for brevity) 730. As described elsewhere in the present disclosure, the plurality of images associated with the at least two ROIs are determined based on scanning data of the at least two ROIs generated in a single scan performed on the at least two ROIs.

In 620, for each of the at least two ROIs, the processing device 120 (e.g., the processor 210) (e.g., the identification module 420) may determine a start position and an end position of the ROI in a reference image.

As described in connection with operation 510, the reference image may include a scout image or an optical image of the at least two ROIs. As illustrated in FIG. 7, the patient 705 may be placed on the table 114 and a scout image 710 of the patient 705 may be obtained based on scanning data obtained by scanning the entire body of the patient 705 in a pre-scan. It is assumed that during the pre-scan, the scanning direction of the scanner 110 may be from the head to the feet of the patient 705 (i.e., along a negative direction of the Y axis of the coordinate system 160). Accordingly, the processing device 120 may determine the start position and the end position of the ROI in the scout image 710 along the scanning direction.

For example, for the head 720, the processing device 120 may recognize, using a recognition algorithm or a recognition model (as described in connection with operation 510 and operation 810, the recognition algorithm or the recognition model used to recognize a portion of an ROI based on anatomical features), a first edge 721 and a second edge 722 of the head 720 along the scanning direction. Then the processing device 120 may determine a position corresponding to the first edge 721 of the head 720 as the start position and determine a position corresponding to the second edge 722 of the head 720 as the end position. The start position may correspond to a first Y coordinate of the coordinate system 160 and the end position may correspond to a second Y coordinate of the coordinate system 160. Similarly, for the chest 730, the processing device 120 may recognize, using the recognition algorithm or the recognition model, a first edge 731 and a second edge 732 of the chest 730 along the scanning direction. Then the processing device 120 may determine a position corresponding to the first edge 731 of the chest 730 as the start position of the chest 730 and determine a position corresponding to the second edge 732 of the chest 730 as the end position of the chest 730. The start position may correspond to a third Y coordinate of the coordinate system 160 and the end position may correspond to a fourth Y coordinate of the coordinate system 160.

In 630, the processing device 120 may identify, from the plurality of images, a start image and an end image corresponding to the start position and the end position, respectively.

In some embodiments, as described above, the plurality of images may be determined based on scanning data of the at least two ROIs generated in a single scan performed on the at least two ROIs. The single scan may be a scan for obtaining scanning data corresponding to a plurality of slices vertical to (i.e., parallel to X-Z plane) the scanning direction (i.e., the negative direction of the Y axis) of the pre-scan and a global direction for scanning the plurality of slices may be consistent with the scanning direction of the pre-scan. Accordingly, the plurality of images may be images corresponding to the plurality of slices, and the start image and the end image may be images corresponding to slices at the start position and the end position, respectively. For example, the start image of the head 720 may be an image reconstructed based on scanning data corresponding to a slice at the first Y coordinate of the coordinate system 160. The end image of the head 720 may be an image reconstructed based on scanning data corresponding to a slice at the second Y coordinate of the coordinate system 160. The start image of the chest 730 may be an image reconstructed based on scanning data corresponding to a slice at the third Y coordinate of the coordinate system 160. The end image of the chest 730 may be an image reconstructed based on scanning data corresponding to a slice at the fourth Y coordinate of the coordinate system 160.

In 640, the processing device 120 may determine the start image, the end image, and intermediate images between the start image and the end image as the local images of the ROI.

As described above, the global direction for scanning the plurality of slices is consistent with the scanning direction of the pre-scan. Accordingly, the plurality of images corresponding to the plurality of slices may be arranged or stored sequentially along the global direction (i.e., along the negative direction of the Y axis). After identifying the start image and the end image, the processing device 120 can easily determine one or more intermediate images between the start image and the end image. Then the processing device 120 may determine the start image, the end image, and the one or more intermediate images as the local images of the ROI.

It should be noted that the above description of the process 600 is provided for the purposes of illustration, not intended to limit the scope of the present disclosure. For persons having ordinary skills in the art, multiple variations and modifications may be reduced to practice in the light of the present disclosure. For example, the plurality of images may be arranged or stored sequentially along a direction opposite to the scanning direction of the pre-scan. Accordingly, the start image and the end image may be identified along the opposite direction. As another example, the start position and/or the end position may be determined manually by a user (e.g., a doctor, an operator) via a touch screen, a mouse, a key, etc. As a further example, for at least one of the at least two ROIs, an outline of the ROI may be determined in the reference image. Accordingly, edges of the ROI in both the scanning direction (e.g., the Y direction) and a direction (e.g., the X direction) perpendicular to the scanning direction may be determined, such that the start position and/or the end position of the ROI can be determined more accurately. However, these variations and modifications fall in the scope of the present disclosure.

FIG. 8 is a flowchart illustrating an exemplary process for identifying local images of each of at least two ROIs from a plurality of images according to some embodiments of the present disclosure. In some embodiments, the process 800 may be executed by the imaging system 100. For example, the process 800 may be implemented as a set of instructions (e.g., an application) stored in a storage device (e.g., the storage device 130). The modules described in FIG. 4 and/or the processor 210 may execute the set of instructions and may accordingly be directed to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, for each of the at least two ROIs, the processing device 120 (e.g., the processor 210) (e.g., the identification module 420) may sequentially process the plurality of images, during which, for one of the plurality of images, the processing device 120 may identify anatomical features in the image and recognize a portion of the ROI in the image based on the anatomical features by using a recognition algorithm or a recognition model.

As described in connection with FIG. 5, the recognition algorithm or the recognition model may be used to recognize an ROI or a portion of the ROI based on the anatomical features. In some embodiments, the anatomical features may include an outline, a shape, a size, an edge, a gray value, or the like, or a combination thereof.

In 820, the processing device 120 (e.g., the processor 210) (e.g., the identification module 420) may determine a start image of the ROI from the plurality of images. The start image may correspond to a time point when a portion of the ROI is firstly recognized during sequentially processing the plurality of images.

In 830, the processing device 120 (e.g., the processor 210) (e.g., the identification module 420) may determine an end image of the ROI from the plurality of images. The end image may correspond to a time point when a portion of the ROI is lastly recognized during sequentially processing the plurality of images.

In 840, the processing device 120 (e.g., the processor 210) (e.g., the identification module 420) may determine the start image, the end image, and intermediate images between the start image and the end image as the local images of the ROI. As described in connection with FIG. 6, the plurality of images may be arranged or stored sequentially along the global direction. Accordingly, after identifying the start image and the end image, the processing device 120 can easily determine one or more intermediate images between the start image and the end image. Then the processing device 120 may determine the start image, the end image, and the one or more intermediate images as the local images of the ROI.

It should be noted that the above description of the process 800 is provided for the purposes of illustration, not intended to limit the scope of the present disclosure. For persons having ordinary skills in the art, multiple variations and modifications may be reduced to practice in the light of the present disclosure. However, these variations and modifications fall in the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
    at least one storage device storing a set of instructions; and
    at least one processor configured to communicate with the at least one storage device, wherein when executing the set of instructions, the at least one processor is directed to perform operations including:
    obtaining reference information associated with at least two regions of interest (ROIs) of a subject;
    obtaining a plurality of images associated with the at least two ROIs, the plurality of images being determined based on scanning data of the at least two ROIs generated in a single scan performed on the at least two ROIs by an imaging device; and
    identifying local images of each of the at least two ROIs from the plurality of images based on the reference information.

2. The system of claim 1, wherein the reference information includes a scout image or an optical image of the at least two ROIs, the scout image or the optical image indicating position information of the at least two ROIs during the single scan.

3. The system of claim 2, wherein identifying the local images of each of the at least two ROIs from the plurality of images based on the reference information includes:
    for each of the at least two ROIs,
    determining a start position and an end position of the ROI in the scout image or the optical image; and
    identifying the local images of the ROI from the plurality of images based on the start position and the end position.

4. The system of claim 3, wherein identifying the local images of the ROI from the plurality of images based on the start position and the end position includes:
    identifying, from the plurality of images, a start image and an end image corresponding to the start position and the end position, respectively; and
    determining the start image, the end image, and intermediate images between the start image and the end image as the local images of the ROI.

5. The system of claim 1, wherein the reference information includes a recognition algorithm or a recognition model associated with the at least two ROIs.

6. The system of claim 5, wherein identifying the local images of each of the at least two ROIs from the plurality of images based on the reference information includes:
    for each of the at least two ROIs,
    sequentially processing the plurality of images, during which, for one of the plurality of images,
    identifying anatomical features in the image; and
    recognize a portion of the ROI in the image based on the anatomical features by using the recognition algorithm or the recognition model;
    determining a start image of the ROI from the plurality of images, the start image corresponding to a time point when a portion of the ROI is firstly recognized during sequentially processing the plurality of images;
    determining an end image of the ROI from the plurality of images, the end image corresponding to a time point when a portion of the ROI is lastly recognized during sequentially processing the plurality of images; and
    determining the start image, the end image, and intermediate images between the start image and the end image as the local images of the ROI.

7. The system of claim 1, wherein the single scan is performed according to a scanning protocol determined based at least in part on a scout image associated with the at least two ROIs.

8. The system of claim 1, the operations further including:
    for each of the at least two ROIs, assigning a corresponding label to the local images of the ROI, wherein the label includes at least one of scanning parameters of a scanner, basic information of the subject, or a time when an imaging scan is performed.

9. The system of claim 1, the operations further including:
    dividing local images of the at least two ROIs into respective groups to be processed separately.

10. The system of claim 1, the operations further including:
    obtaining, from a user device, a request for local images of a target ROI of the at least two ROIs;
    retrieving local images of the target ROI; and
    transmitting the retrieved local images of the target ROI to the user device.

11. The system of claim 1, wherein an imaging scan region of the single scan includes the at least two ROIs.

12. The system of claim 1, wherein the identifying the local images of each of the at least two ROIs from the plurality of images based on the reference information includes:
    for each of the at least two ROIs, for one of the plurality of images,
    identifying anatomical features in the image;
    recognizing a portion of the ROI in the image based on the anatomical features;
    determining a start image and an end image of the ROI from the plurality of images, and determining the start image, the end image, and intermediate images between the start image and the end image as the local images of the ROI.

13. The system of claim 12, wherein the anatomical features include at least one of an outline, a shape, a size, an edge, or a gray value.

14. A method implemented on a computing device having a processor and a computer-readable storage device, the method comprising:
- obtaining reference information associated with at least two regions of interest (ROIs) of a subject;
- obtaining a plurality of images associated with the at least two ROIs, the plurality of images being determined based on scanning data of the at least two ROIs generated in a single scan performed on the at least two ROIs by an imaging device; and
- identifying local images of each of the at least two ROIs from the plurality of images based on the reference information.

15. The method of claim 14, wherein the reference information includes a scout image or an optical image of the at least two ROIs, the scout image or the optical image indicating position information of the at least two ROIs during the single scan.

16. The method of claim 15, wherein identifying the local images of each of the at least two ROIs from the plurality of images based on the reference information includes:
for each of the at least two ROIs,
- determining a start position and an end position of the ROI in the scout image or the optical image; and
- identifying the local images of the ROI from the plurality of images based on the start position and the end position.

17. The method of claim 16, wherein identifying the local images of the ROI from the plurality of images based on the start position and the end position includes:
- identifying, from the plurality of images, a start image and an end image corresponding to the start position and the end position, respectively; and
- determining the start image, the end image, and intermediate images between the start image and the end image as the local images of the ROI.

18. The method of claim 14, wherein the reference information includes a recognition algorithm or a recognition model associated with the at least two ROIs.

19. The method of claim 18, wherein identifying the local images of each of the at least two ROIs from the plurality of images based on the reference information includes:
for each of the at least two ROIs,
- sequentially processing the plurality of images, during which, for one of the plurality of images,
- identifying anatomical features in the image; and
- recognize a portion of the ROI in the image based on the anatomical features by using the recognition algorithm or the recognition model;
- determining a start image of the ROI from the plurality of images, the start image corresponding to a time point when a portion of the ROI is firstly recognized during sequentially processing the plurality of images;
- determining an end image of the ROI from the plurality of images, the end image corresponding to a time point when a portion of the ROI is lastly recognized during sequentially processing the plurality of images; and
- determining the start image, the end image, and intermediate images between the start image and the end image as the local images of the ROI.

20. A non-transitory computer-readable storage medium including instructions, that, when accessed by at least one processor of a system, causes the system to perform a method, the method comprising:
- obtaining reference information associated with at least two regions of interest (ROIs) of a subject;
- obtaining a plurality of images associated with the at least two ROIs, the plurality of images being determined based on scanning data of the at least two ROIs generated in a single scan performed on the at least two ROIs by an imaging device; and
- identifying local images of each of the at least two ROIs from the plurality of images based on the reference information.

* * * * *